(12) United States Patent
Toko et al.

(10) Patent No.: US 12,534,124 B2
(45) Date of Patent: Jan. 27, 2026

(54) TURNING CONTROL DEVICE, STEERING DEVICE, AND VEHICLE

(71) Applicants: JTEKT CORPORATION, Kariya (JP); TOYOTA JIDOSHA KABUSHIKI KAISHA, Toyota (JP)

(72) Inventors: Takahiro Toko, Takahama (JP); Hiromasa Tamaki, Okazaki (JP); Reina Naruse, Kariya (JP); Kimiaki Ono, Okazaki (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 18/768,243

(22) Filed: Jul. 10, 2024

(65) Prior Publication Data

US 2025/0026401 A1    Jan. 23, 2025

(30) Foreign Application Priority Data

Jul. 18, 2023  (JP) .................. 2023-117109

(51) Int. Cl.
*B62D 5/04* (2006.01)
*B62D 6/00* (2006.01)

(52) U.S. Cl.
CPC ............. *B62D 5/046* (2013.01); *B62D 6/002* (2013.01)

(58) Field of Classification Search
CPC .............................. B62D 5/046; B62D 6/002
See application file for complete search history.

(56) References Cited

U.S. PATENT DOCUMENTS 11,332,157 B2 *   5/2022   Kawakami .......... B60W 40/105
2023/0286573 A1   9/2023   Suzuki et al.

FOREIGN PATENT DOCUMENTS

EP    4227191 A1    8/2023
JP    2020-160847 A   10/2020
WO    2022/074826 A1   4/2022

OTHER PUBLICATIONS

Nov. 26, 2024 Extended Search Report issued in European Patent Application No. 24187724.0.

* cited by examiner

*Primary Examiner* — Mark L. Greene
(74) *Attorney, Agent, or Firm* — Oliff PLC

(57) ABSTRACT

A turning control device includes: a target steering angle acquisition circuit; a differential value calculation circuit; a short-term target steering angle calculation circuit that calculates, by distributing a differential value, a short-term target steering angle that is a target value of the steering angle for each control cycle shorter than an acquisition cycle; and a motor control circuit. The short-term target steering angle calculation circuit calculates the short-term target steering angle based on a multiplied value obtained by multiplying the differential value by a coefficient according to the number of times of the control cycle since the target steering angle acquisition circuit has newly acquired a target steering angle, and on the target value of the steering angle before the acquisition.

7 Claims, 7 Drawing Sheets

RELATED ART

TURNING CONTROL DEVICE, STEERING DEVICE, AND VEHICLE

CROSS-REFERENCE TO RELATED APPLICATION

This application claims priority to Japanese Patent Application No. 2023-117109 filed on Jul. 18, 2023, incorporated herein by reference in its entirety.

BACKGROUND

1. Technical Field

The present disclosure relates to a turning control device that controls a turning actuator capable of turning a steered wheel of a vehicle, and to a steering device and a vehicle.

2. Description of Related Art

Various proposals have been made concerning driving assistance control such as autonomous driving control and advanced driver assistance systems (hereinafter referred to as "ADAS") of vehicles. According to the description of Japanese Unexamined Patent Application Publication No. 2020-160847, a plurality of electronic control units (ECUs) that controls various on-board devices is connected to an ADAS-ECU that is a superordinate controller through a communication bus, and the ADAS-ECU sends command signals to the respective ECUs based on image information obtained by an on-board camera and geographical information such as GPS information to control travel of the vehicle. The plurality of ECUs connected to the ADAS-ECU through the communication bus includes an engine control ECU that performs control of an engine, a transmission ECU that performs control of a transmission, a VSC-ECU that performs control of a brake etc., and an EPS-ECU that controls an electric steering device.

SUMMARY

For example, in the vehicle configured as described above, a turning control device that controls a turning mechanism that turns steered wheels can perform control of a steering angle on a control cycle shorter than a cycle on which a command signal is sent from the superordinate controller. Recent years have seen a trend of the control cycle becoming shorter than ever before as information processing technologies, such as microprocessors, have been becoming more sophisticated. In the case where a signal of a target steering angle is sent from the superordinate controller to the turning control device on a predetermined cycle, to prevent occurrence of vibration and noise due to a sudden change in the steering angle, it is conceivable that the turning control device distributes the difference between the target steering angle acquired last time and the target steering angle acquired this time among a plurality of control cycles and gradually brings the actual steering angle that is the actually existing steering angle to the newly acquired target steering angle.

In this case, if the difference between the target steering angle acquired last time and the newly acquired target steering angle is small, when distributing this difference among the plurality of control cycles, cancellation of significant digits may occur in the calculation of the target value of the steering angle that is stored in the turning control device as information on a numerical value with a predetermined number of bits, so that the target value of the steering angle in each control cycle may fail to be appropriately set. That is, in the case where the turning control device performs processing of n (n is an integer) times of control cycles while the target steering angle from the superordinate controller is updated, and gradually adds, as an increment in the target value of the steering angle for each control cycle, a value obtained by dividing the difference between the target steering angle acquired last time and the newly acquired target steering angle by n, if the value obtained by dividing the difference between the target steering angle acquired last time and the newly acquired target steering angle by n is smaller than a value represented by a least significant bit (LSB), this increment becomes 0 (zero), which means the target value of the steering angle for each control cycle remains the same until the target steering angle is acquired from the superordinate controller next time.

The present disclosure provides a turning control device, a steering device, and a vehicle that can appropriately set a target value of the steering angle for each control cycle so as to smoothly change the steering angle.

A first aspect of the present disclosure is a turning control device. The turning control device controls an actuator configured to turn a steered wheel of a vehicle by a motor. The turning control device includes: a target steering angle acquisition circuit configured to acquire a target steering angle on a predetermined acquisition cycle; a differential value calculation circuit configured to, when the target steering angle acquisition circuit has newly acquired the target steering angle, calculate a differential value that is a difference between a target value of a steering angle before the acquisition and the newly acquired target steering angle; a short-term target steering angle calculation circuit configured to calculate, by distributing the differential value, a short-term target steering angle that is a target value of the steering angle for each control cycle shorter than the acquisition cycle; and a motor control circuit configured to control the motor such that an actual steering angle becomes closer to the short-term target steering angle in each of the control cycles. The short-term target steering angle calculation circuit is configured to calculate the short-term target steering angle based on a multiplied value obtained by multiplying the differential value by a coefficient according to the number of times of the control cycle since the target steering angle acquisition circuit has newly acquired the target steering angle, and on the target value of the steering angle before the acquisition.

A second aspect of the present disclosure is a steering device. The steering device includes: a steering wheel configured to be operated by a driver; a steering shaft coupled to the steering wheel; a reaction force actuator configured to apply a steering reaction force to the steering shaft; a turning actuator configured to turn a steered wheel of a vehicle by a motor; and a control device configured to control the reaction force actuator and the turning actuator. The control device includes: a target steering angle setting circuit configured to set a target steering angle that is a target value of a steering angle of the steered wheel based on vehicle information; a target steering angle acquisition circuit configured to acquire the target steering angle from the target steering angle setting circuit on a predetermined acquisition cycle; a differential value calculation circuit configured to, when the target steering angle acquisition circuit has newly acquired the target steering angle, calculate a differential value that is a difference between the target value of the steering angle before the acquisition and the newly acquired target steering angle; a short-term target steering angle calculation circuit configured to calculate, by distributing the differential value, a short-term target steering angle that is a target value of the steering angle for each control cycle shorter than the acquisition cycle; and a motor control circuit configured to control the motor such that an actual steering angle becomes closer to the short-term target steering angle in each of the control cycles. The short-term target steering angle calculation circuit is configured to calculate the short-term target steering angle based on a multiplied value obtained by multiplying the differential value by a coefficient according to the number of times of the control cycle since the target steering angle acquisition circuit has newly acquired the target steering angle, and on the target value of the steering angle before the acquisition.

A third aspect of the present disclosure is a vehicle. The vehicle includes: a turning actuator configured to turn a steered wheel of the vehicle by a motor; a target steering angle setting circuit configured to set a target steering angle that is a target value of a steering angle based on vehicle information; a target steering angle acquisition circuit configured to acquire the target steering angle from the target steering angle setting circuit on a predetermined acquisition cycle; a differential value calculation circuit configured to, when the target steering angle acquisition circuit has newly acquired the target steering angle, calculate a differential value that is a difference between the target value of the steering angle before the acquisition and the newly acquired target steering angle; a short-term target steering angle calculation circuit configured to calculate, by distributing the differential value, a short-term target steering angle that is a target value of the steering angle for each control cycle shorter than the acquisition cycle; and a motor control circuit configured to control the motor such that an actual steering angle becomes closer to the short-term target steering angle in each of the control cycles. The short-term target steering angle calculation circuit is configured to calculate the short-term target steering angle based on a multiplied value obtained by multiplying the differential value by a coefficient according to the number of times of the control cycle since the target steering angle acquisition circuit has newly acquired the target steering angle, and on the target value of the steering angle before the acquisition.

The turning control device, the steering device, and the vehicle according to the present disclosure make it possible to appropriately set a target value of the steering angle for each control cycle so as to smoothly change the steering angle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A first embodiment of the present disclosure will be described with reference to FIG. 1 through FIG. 4. Embodiments to be described below will be shown as specific examples that are suitable for implementing the present disclosure. While various technical items that are technically preferable will be specifically illustrated at some parts, the technical scope of the present disclosure is not limited to such specific aspects.

Figure 1:
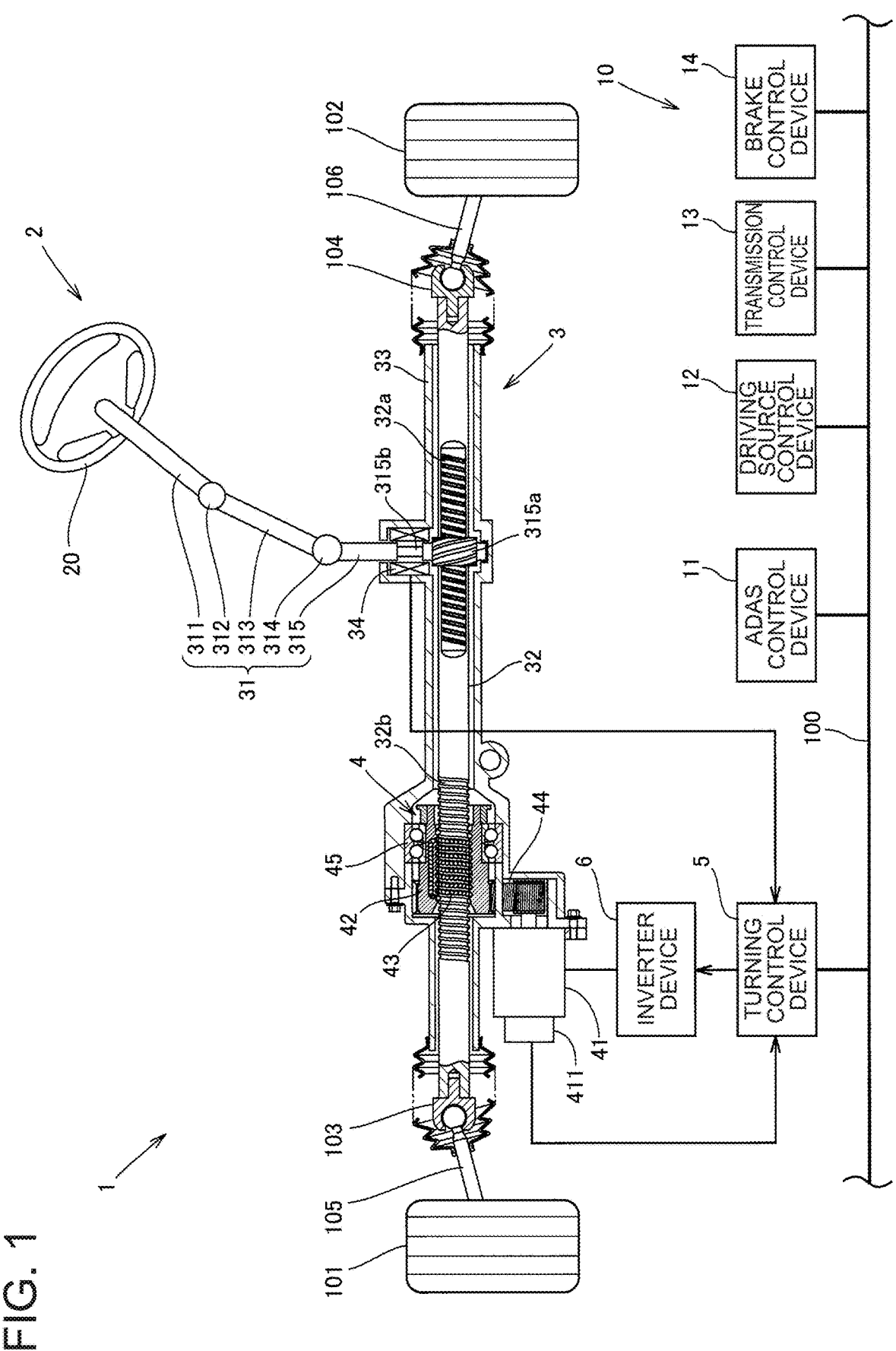
FIG. 1 is a configuration diagram showing an example of the schematic configuration of a vehicle according to a first embodiment of the present disclosure.

FIG. 1 is a configuration diagram showing an example of the schematic configuration of a vehicle 1 according to the first embodiment of the present disclosure. The vehicle 1 has driving assistance functions for assisting a driver in driving operation. More specifically, the vehicle 1 has, as the driving assistance functions, an autonomous parking function of making the own vehicle park into an intended parking space, and an adaptive cruise control function of traveling on an expressway so as to follow up a preceding vehicle. FIG. 1 shows the configuration of a turning device 2 that turns left and right front wheels 101, 102 that are steered wheels of the vehicle 1, and the configuration of a control system 10 of the vehicle 1 including an ADAS control device 11 that performs driving assistance control.

The turning device 2 includes: a steering wheel 20 that the driver of the vehicle 1 operates; a turning mechanism 3 capable of turning the left and right front wheels 101, 102 through operation of the steering wheel 20; a turning actuator 4 mounted in the turning mechanism 3; a turning control device 5 that controls the turning actuator 4; and an inverter device 6 that supplies a driving current to a motor 41 that is a driving source of the turning actuator 4. During manual driving in which the driver performs driving operation of the vehicle 1 by the steering wheel 20 etc., the turning actuator 4 can apply a steering assisting force that assists the driver in steering operation to the turning mechanism 3, and when making the vehicle 1 travel autonomously under control of the ADAS control device 11, the turning actuator 4 can operate the turning mechanism 3 by the motor 41 and turn the front wheels 101, 102 without involving the driver's operation of the steering wheel 20.

The turning mechanism 3 has a steering shaft 31, a rack shaft 32 that extends in a vehicle width direction, a tubular housing 33 that houses the rack shaft 32, and a torque sensor 34 that detects a steering torque applied to the steering wheel 20. The steering shaft 31 has a column shaft 311 with the steering wheel 20 mounted at an end part, an intermediate shaft 313 coupled to the column shaft 311 through a joint 312, and a pinion shaft 315 coupled to the intermediate shaft 313 through a joint 314.

In the pinion shaft 315, pinion teeth 315a are formed at an end part, and these pinion teeth 315a mesh with rack teeth 32a provided in the rack shaft 32. When the steering shaft 31 rotates with the steering wheel 20, due to meshing of the pinion teeth 315a and the rack teeth 32a, the rack shaft 32 moves along the vehicle width direction, in an axial direction relative to the housing 33.

Part of the pinion shaft 315 on the side of the intermediate shaft 313 relative to the pinon teeth 315a is formed by a torsion bar 315b. The torsion bar 315b has such low rigidity that it is twisted by a steering torque. The torque sensor 34 detects the steering torque by an amount of twisting of the torsion bar 315b. A signal showing the detection result of the steering torque detected by the torque sensor 34 is sent to the turning control device 5.

At both end parts of the rack shaft 32, ball joints 103, 104 are respectively mounted, and one end part of each of left and right tie rods 105, 106 is swingably coupled to the rack shaft 32 by the ball joint 103 or 104. The other end part of each of the tie rods 105, 106 is coupled to a corresponding one of knuckles (not shown) that support the left and right front wheels 101, 102. When the rack shaft 32 moves in the axial direction, the front wheels 101, 102 are turned.

The turning actuator 4 is capable of turning the left and right front wheels 101, 102 by the motor 41. In this embodiment, the turning actuator 4 is disposed so as to apply a moving force in the axial direction to the rack shaft 32. The turning actuator 4 has the motor 41, a ball screw nut 42 disposed on an outer circumference of the rack shaft 32, a plurality of balls 43 that rolls in circles between the ball screw nut 42 and the rack shaft 32, a belt 44 that transmits a rotary force of the motor 41 to the ball screw nut 42, and a bearing 45 that rotatably supports the ball screw nut 42 on the housing 33.

In the rack shaft 32, a spiral groove 32b in which the plurality of balls 43 rolls is formed. When the motor 41 rotates, the rack shaft 32 moves in the axial direction. The motor 41 is provided with a rotation position sensor 411 that indicates a rotation position of a stator relative to a rotor. A signal indicating the detection result of the rotation position sensor 411 is sent to the turning control device 5. The turning control device 5 can obtain the turning angle of the front wheels 101, 102 by a calculation based on the detection result of the rotation position sensor 411. However, the configuration of the turning actuator 4 is not limited to this one. For example, a moving force in the axial direction may be applied to the rack shaft 32 through meshing among a plurality of gears, or a rotary force may be applied to the column shaft 311 or the pinion shaft 315.

During manual driving, the turning control device 5 generates, by the turning actuator 4, a steering assisting force according to the steering torque detected by the torque sensor 34. When the vehicle 1 travels using a driving assistance function, the turning control device 5 controls the turning actuator 4 and operates the turning mechanism 3 by receiving a command from the ADAS control device 11.

As shown in FIG. 1, the turning control device 5 and the ADAS control device 11 are connected to a communication bus 100 inside the vehicle 1, and are capable of transmission and reception through the communication bus 100. In this embodiment, the communication bus 100 is formed by a controller area network (CAN) that is a standard network standardized by ISO11898. When no signal is flowing through the communication bus 100, each of nodes connected to the communication bus 100, including the turning control device 5 and the ADAS control device 11, can start transmission, and when a signal is flowing through the communication bus 100, these nodes start transmission after waiting for the communication bus 100 to become vacant.

Other than the turning control device 5 and the ADAS control device 11, various control devices such as a driving source control device 12, a transmission control device 13, and a brake control device 14 are connected to the communication bus 100. The driving source control device 12 controls driving sources for travel of the vehicle 1, such as an engine and an electric motor. The transmission control device 13 controls a transmission that performs speed change of output rotation of the driving sources. The brake control device 14 controls a brake that brakes the vehicle 1. The ADAS control device 11 sends commands to these control devices when the vehicle 1 travels using a driving assistance function. Thus, the ADAS control device 11 is equivalent to a superordinate controller of the turning control device 5, the driving source control device 12, the transmission control device 13, and the brake control device 14. In the following, contents of control by the ADAS control device 11 and the turning control device 5 when the vehicle 1 travels using a driving assistance function will be described.

Figure 2:
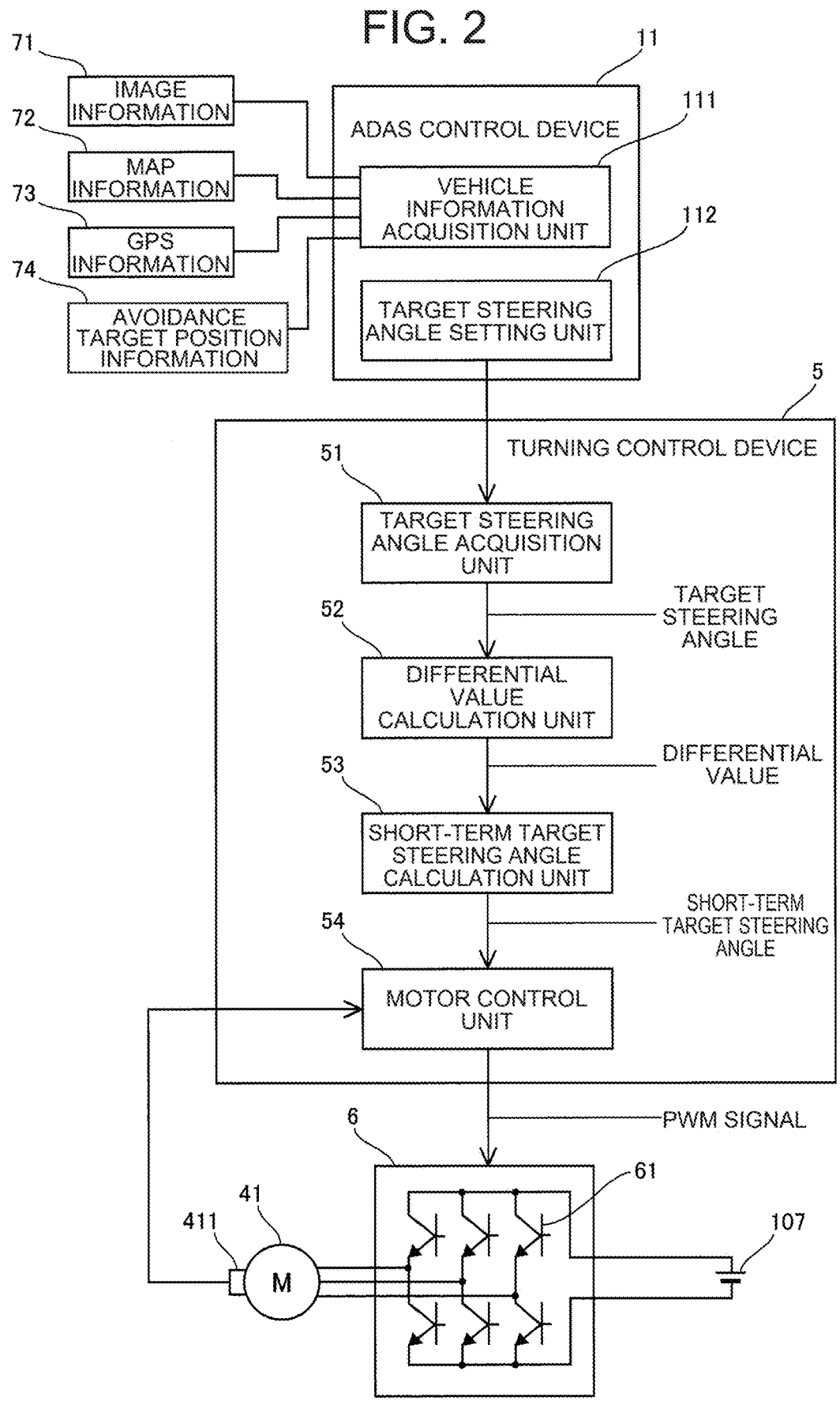
FIG. 2 is a block diagram showing the functional configurations of part of an ADAS control device and a turning control device and an example of the configuration of an inverter device.

FIG. 2 is a block diagram showing the functional configurations of part of the ADAS control device 11 and the turning control device 5 and an example of the configuration of the inverter device 6. The ADAS control device 11 has a vehicle information acquisition unit 111 that acquires vehicle information obtained from various devices, sensors, etc. installed in the own vehicle (vehicle 1), and a target steering angle setting unit 112 that sets a target steering angle that is a target value of the turning angle of the front wheels 101, 102 based on the vehicle information acquired by the vehicle information acquisition unit 111. Examples of this vehicle information include image information 71 on images captured by an on-board camera, map information 72 that is geographical information on surroundings of the own vehicle, GPS information 73 showing the current position of the own vehicle, and avoidance target position information 74 showing the position of an avoidance target relative to the own vehicle obtained by a radar device. Here, an avoidance target is a target with which the own vehicle should avoid contact, such as other vehicles, obstacles, and pedestrians. The vehicle information acquisition unit 111 of the ADAS control device 11 can acquire these pieces of information through, for example, the communication bus 100.

The turning control device 5 has, as functional components, a target steering angle acquisition unit 51, a differential value calculation unit 52, a short-term target steering angle calculation unit 53, and a motor control unit 54. The target steering angle acquisition unit 51, the differential value calculation unit 52, the short-term target steering angle calculation unit 53, and the motor control unit 54 can be realized, for example, as the CPU (arithmetic processing device) of the turning control device 5 executes programs stored in a semiconductor memory.

The target steering angle acquisition unit 51 acquires, on a predetermined acquisition cycle, the target steering angle set by the target steering angle setting unit 112 of the ADAS control device 11 through CAN communication via the communication bus 100. This acquisition cycle is, for example, 20 ms to 50 ms. When the target steering angle acquisition unit 51 has newly acquired the target steering angle, the differential value calculation unit 52 calculates a differential value that is a difference between the target value of the steering angle before the acquisition and the current value of the target steering angle that is the newly acquired target steering angle. The short-term target steering angle calculation unit 53 distributes the differential value calculated by the differential value calculation unit 52, and thereby calculates a short-term target steering angle that is a target value of the steering angle for each control cycle shorter than the acquisition cycle on which the target steering angle acquisition unit 51 acquires the target steering angle. This control cycle is, for example, 1.0 ms or shorter.

The motor control unit 54 controls the motor 41 such that the actual steering angle that is the actual turning angle of the front wheels 101, 102 becomes closer to the short-term target steering angle in each control cycle. Specifically, the motor control unit 54 performs feedback control on the motor 41 such that the turning angle corresponding to the rotation position of the motor 41 obtained by the rotation position sensor 411 and the short-term target steering angle match. The motor control unit 54 outputs a pulse-width modulation (PWM) signal that turns a plurality of switching elements 61 of the inverter device 6 on and off to the inverter device 6. The inverter device 6 has the plurality of switching elements 61 in three-phase bridge connection, and the on and off states of the switching elements 61 are switched through the PWM signal to switch a direct-current voltage of a battery 107 of the vehicle 1 and supply a three-phase alternating current to the motor 41.

Figure 3:
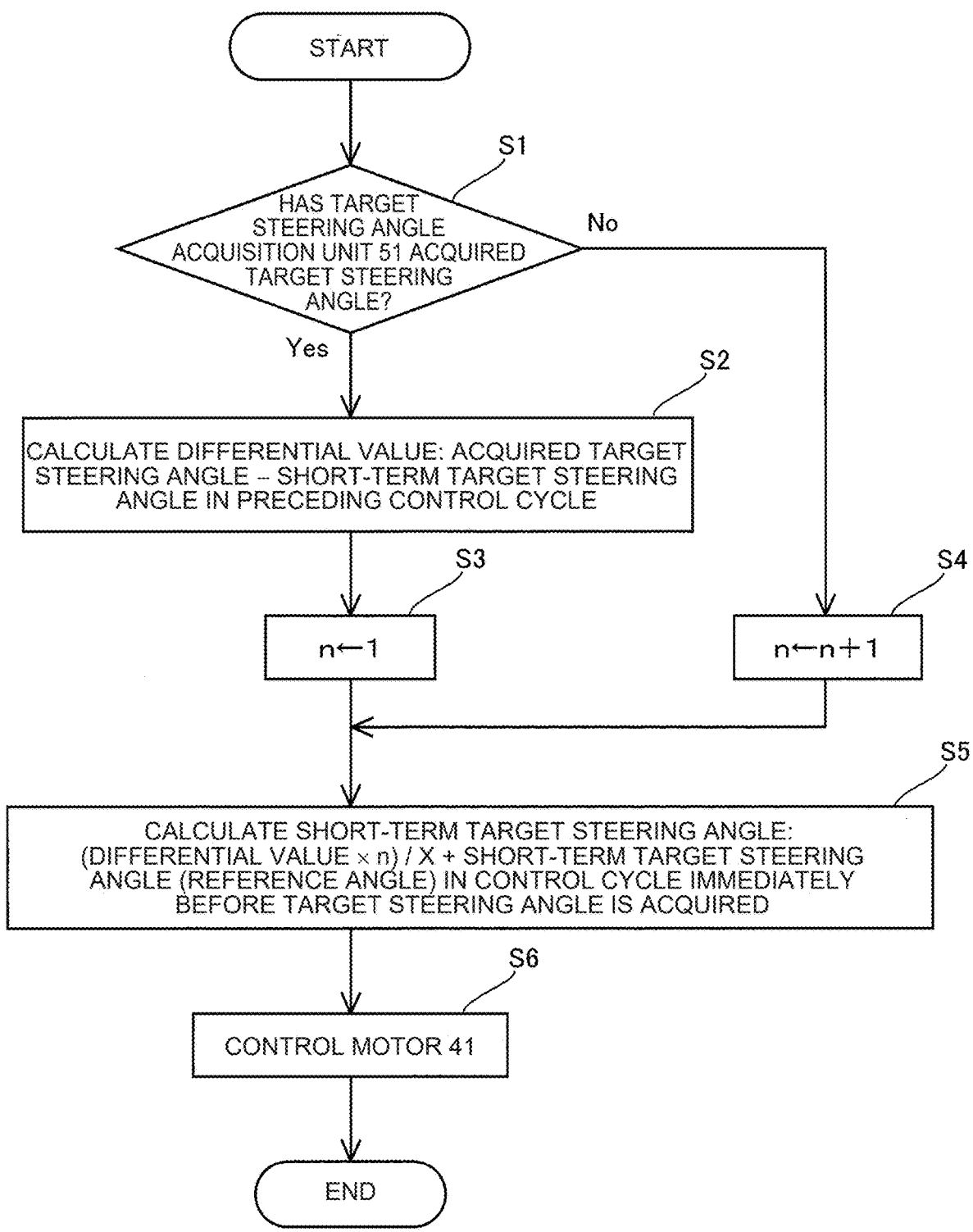
FIG. 3 is a flowchart showing one example of a processing procedure that a differential value calculation unit, a short-term target steering angle calculation unit, and a motor control unit of the turning control device execute in each control cycle.

FIG. 3 is a flowchart showing one example of a processing procedure that the differential value calculation unit 52, the short-term target steering angle calculation unit 53, and the motor control unit 54 of the turning control device 5 execute in each control cycle. The differential value calculation unit 52 determines whether the target steering angle acquisition unit 51 has acquired the target steering angle between the preceding control cycle and the current control cycle (step S1). When the target steering angle has been acquired (step S1: Yes), the differential value calculation unit 52 calculates the differential value between the short-term target steering angle in the preceding control cycle and the newly acquired target steering angle (step S2). This differential value is stored in a memory of the turning control device 5, and is used in processing of the short-term target steering angle calculation unit 53 until the target steering angle acquisition unit 51 acquires the target steering angle next time.

When the determination result of step S1 is Yes, i.e., the differential value calculation unit 52 has updated the differential value in the current control cycle, the short-term target steering angle calculation unit 53 sets a counter value n to 1 that is an initial value (step S3). The counter value indicates the number of times of the control cycle since the target steering angle acquisition unit 51 has newly acquired the target steering angle. The value n is a variable that is incremented for each control cycle, and is a positive integer not smaller than 1. When the determination result of step S1 is No, i.e., the differential value calculation unit 52 has not updated the differential value in the current control cycle, the short-term target steering angle calculation unit 53 adds 1 to n (step S4).

Next, the short-term target steering angle calculation unit 53 calculates the short-term target steering angle in the current control cycle based on a multiplied value obtained by multiplying the differential value by a coefficient according to n, and on the short-term target steering angle in the control cycle immediately before the target steering angle acquisition unit 51 newly acquires the target steering angle (step S5). More specifically, the short-term target steering angle in the control cycle immediately before the target steering angle acquisition unit 51 newly acquires the target steering angle is used as a reference angle, and a value obtained by adding the reference angle to the multiplied value obtained by multiplying the differential value calculated by the differential value calculation unit 52 by the coefficient according to n is used as the short-term target steering angle. When a multiplying factor, relative to the control cycle, of the acquisition cycle that is a time interval at which the target steering angle acquisition unit 51 acquires the target steering angle is X, this coefficient is a value obtained by dividing n by X (n/X). X is a value obtained by dividing the length of the acquisition cycle by the length of the control cycle, and, for example, the value of X is 30 when the acquisition cycle is 30 ms and the control cycle is 1.0 ms. In the case where the acquisition cycle varies depending on the traffic in the communication bus 100, the status of processing in the ADAS control device 11, etc. an average value of the lengths of the acquisition cycle may be used as the value of X. The acquisition cycle may be varied according to a travel mode of the vehicle 1.

Also when, due to variation in the acquisition cycle, the target steering angle acquisition unit 51 has newly acquired the target steering angle at an earlier timing or a later timing than the time of the acquisition cycle that was used for setting the value of X, the above-described calculation is performed using the short-term target steering angle in the immediately preceding control cycle as the reference angle. The value of X may be set as a maximum value of the length of the acquisition cycle such that the target steering angle acquisition unit 51 does not newly acquire the target steering angle at a later timing than the time of the acquisition cycle that was used for setting the value of X.

In the processing of the turning control device 5, the target steering angle and the short-term target steering angle are handled as, for example, 12-bit digital values. In this case, a number (decimal) expressed by a binary (without a sign) in which the 12 bits from the least significant bit (LSB) to the most significant bit (MSB) are all represented by "1" is 4095, and thus the resolution of the target steering angle and the short-term target steering angle is 1/4096. Therefore, a value smaller than this resolution, i.e., a value smaller than a value represented by "000000000001" in binary expression is handled as 0 (zero) due to cancellation of significant digits.

In the process of step S5, to appropriately perform the calculation by preventing this cancellation of significant digits, it is desirable, for example, to multiply the differential value by n and then divide the product by X. When the differential value is multiplied by n, a carry of the most significant bit can occur. In the calculation process of step S5, therefore, it is desirable that the short-term target steering angle be temporarily handled as a numerical value with a larger number of bits (e.g., a 16-bit variable). While it is also possible to perform the calculation of step S5 by a floating-point calculation, performing a floating-point calculation adds to the calculation load on the CPU and is therefore not preferable.

The motor control unit 54 outputs the PWM signal to the inverter device 6 after adjusting the duty ratio thereof such that the rotation position of the motor 41 obtained by the rotation position sensor 411 approaches the position corresponding to the short-term target steering angle calculated by the short-term target steering angle calculation unit 53 (step S6).

Figure 4:
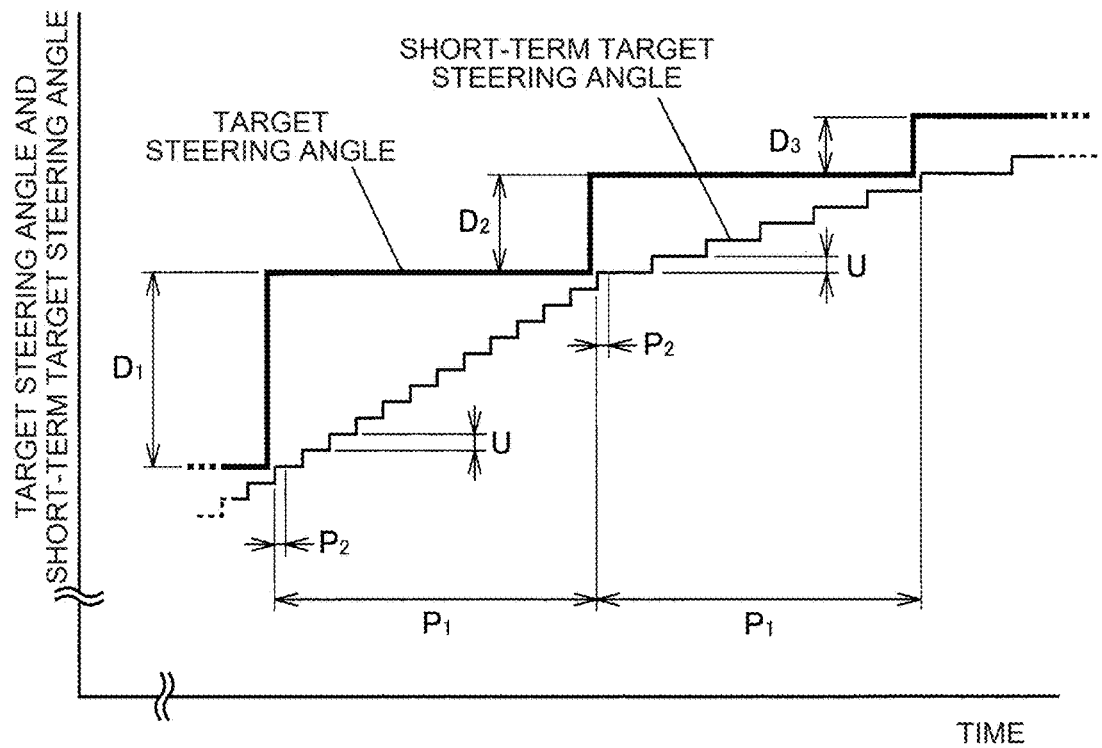
FIG. 4 is a graph showing one example of changes in a target steering angle and a short-term target steering angle.

FIG. 4 is a graph showing one example of changes in the target steering angle and the short-term target steering angle in the case where the short-term target steering angle is calculated by the above-described calculation method. In the graph of FIG. 4, the axis of abscissa is a time axis, and the target steering angle and the short-term target steering angle are shown on the axis of ordinate. In the graph of FIG. 4, the target steering angle is indicated by the thick line and the short-term target steering angle is indicated by the thin line, and the acquisition cycle on which the target steering angle acquisition unit 51 acquires the target steering angle is indicated by $P_1$ and the control cycle is indicated by $P_2$. U indicated in FIG. 4 is the magnitude of a value represented by the least significant bit of a digital value indicating the short-term target steering angle, and $D_1$ to $D_3$ are amounts of change in the target steering angle.

In this embodiment, as shown in FIG. 4, the short-term target steering angle changes from the preceding value of the target steering angle so as to become gradually closer to the current value thereof in increments of the value represented by the least significant bit. The time interval at which the short-term target steering angle changes becomes longer as the differential value that is the difference between the target steering angle acquired by the target steering angle acquisition unit 51 and the short-term target steering angle in the preceding control cycle (the above-described reference angle) becomes smaller. When the difference between the preceding value and the current value of the target steering angle is larger, it is possible that the short-term target steering angle may change during one control cycle by an amount corresponding to an integral multiple of the value represented by the least significant bit.

Figure 5:
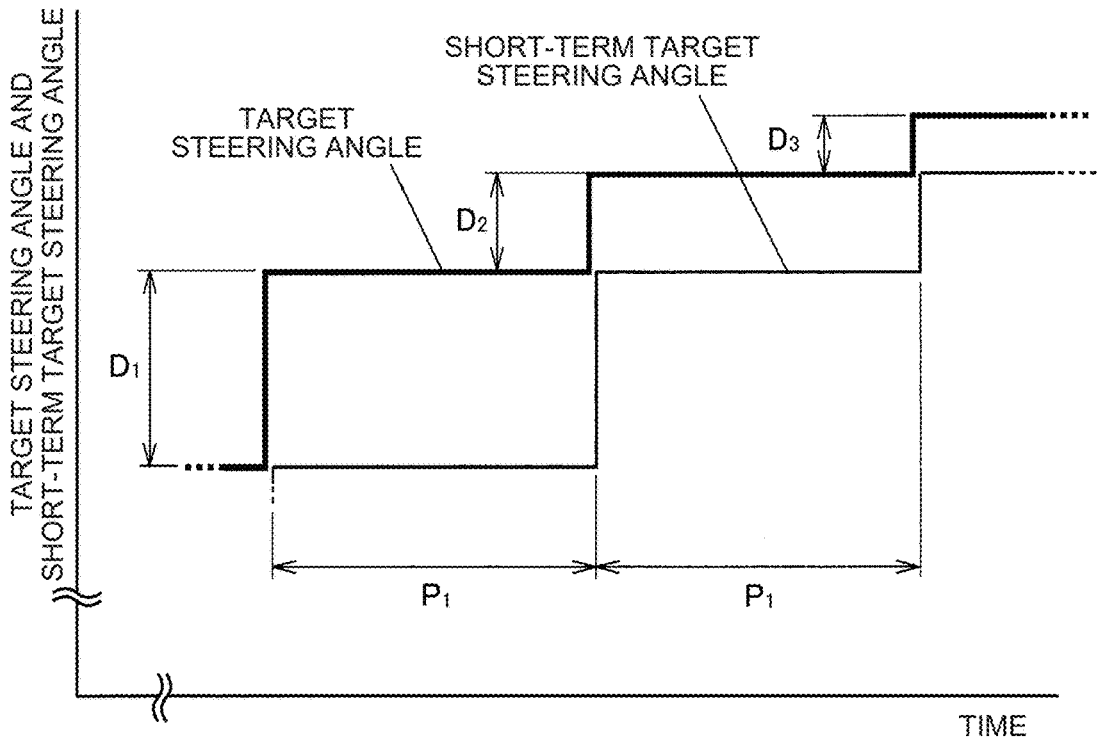
FIG. 5 is a graph showing one example of changes in the target steering angle and the short-term target steering angle in a comparative example.

FIG. 5 is a graph showing, as a comparative example, one example of changes in the target steering angle and the short-term target steering angle in the case where a quotient obtained by dividing the differential value that is the difference between the target steering angle acquired by the target steering angle acquisition unit 51 and the short-term target steering angle in the immediately preceding control cycle by X (a value obtained by dividing the length of the acquisition cycle by the length of the control cycle) is stored as an amount of change in the short-term target steering angle for each control cycle, and in each control cycle, this amount of change is sequentially added to the short-term target steering angle of the preceding control cycle.

In such a calculation method, if cancellation of significant digits occurs in the least significant bit when the differential value is divided by X, the amount of change in the short-term target steering angle for each control cycle becomes 0, so that the short-term target steering angle remains the same until the target steering angle acquisition unit 51 acquires the target steering angle next time, and the short-term target steering angle changes significantly when the target steering angle acquisition unit 51 newly acquires the target steering angle. Thus, when the target steering angle acquisition unit 51 newly acquires the target steering angle, the current supplied to the motor 41 changes significantly, leading to an increase in operation noise and vibration of the turning actuator 4.

In this embodiment, by contrast, the short-term target steering angle changes smoothly as shown in FIG. 4, so that the turning angle of the front wheels 101, 102 can be smoothly changed. Thus, according to this embodiment, by appropriately setting the target value of the steering angle for each control cycle, the motor 41 can be smoothly rotated, and the operation noise and the vibration occurring in the turning actuator 4 can be reduced.

Second Embodiment

Next, a second embodiment of the present disclosure will be described with reference to FIG. 6. The second embodiment differs from the first embodiment in the functional configuration of a turning control device 5A.

Figure 6:
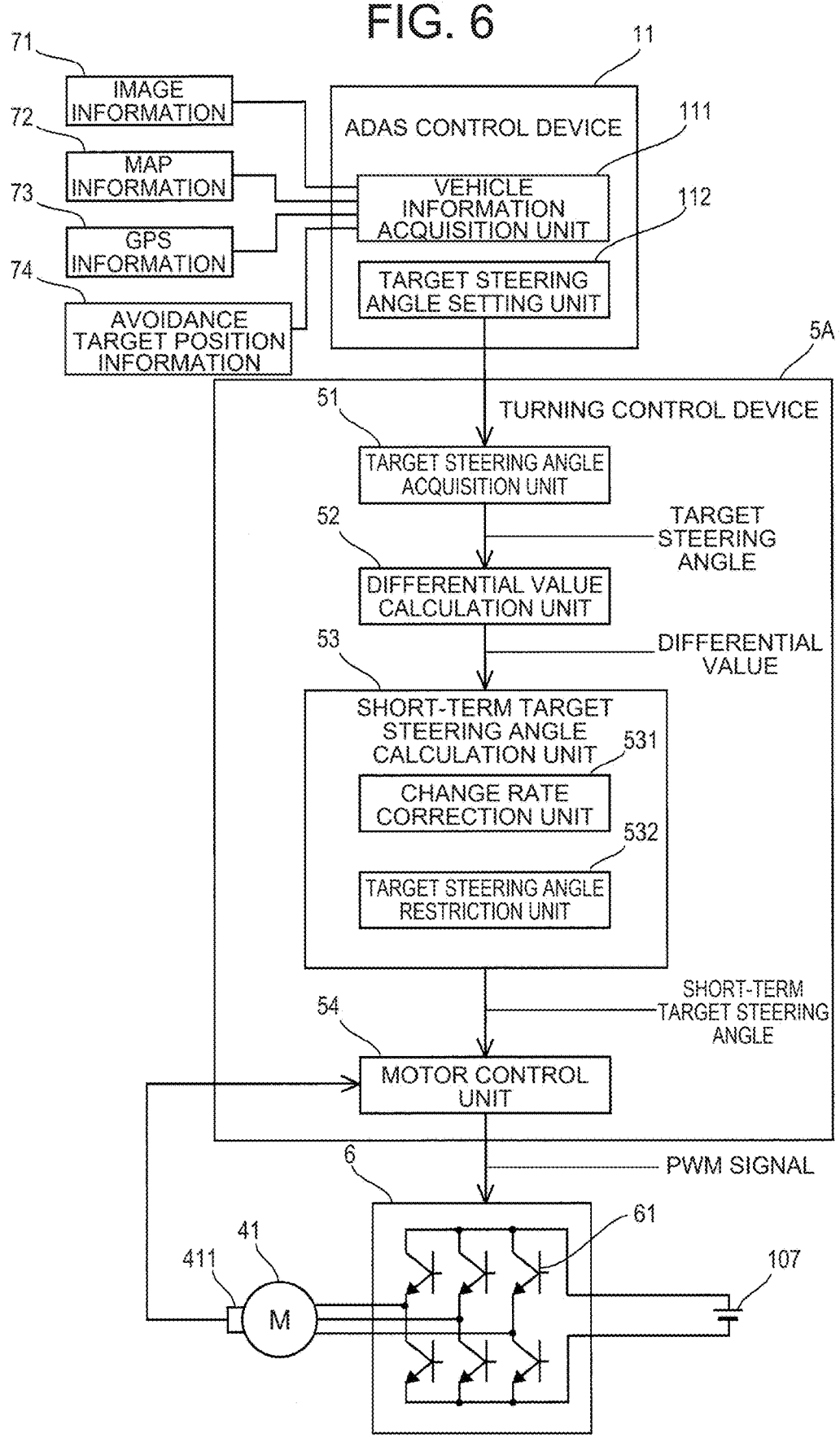
FIG. 6 is a schematic configuration diagram showing the functional configuration of a turning control device according to a second embodiment.

FIG. 6 shows the functional configuration of the turning control device 5A according to the second embodiment. In the turning control device 5A, the short-term target steering angle calculation unit 53 has a change rate correction unit 531 and a target steering angle restriction unit 532. In addition to the processing of the short-term target steering angle calculation unit 53 in the first embodiment, the short-term target steering angle calculation unit 53 in the second embodiment executes processing of the change rate correction unit 531 and the target steering angle restriction unit 532. The processing of the target steering angle acquisition unit 51, the differential value calculation unit 52, the short-term target steering angle calculation unit 53, and the motor control unit 54 is the same as in the first embodiment.

When the short-term target steering angle in an n-th control cycle since the target steering angle acquisition unit 51 has newly acquired the target steering angle changes relative to the short-term target steering angle in the immediately preceding control cycle at a change rate higher than a change rate threshold value that is set according to a vehicle speed, the change rate correction unit 531 corrects the short-term target steering angle in the n-th control cycle such that the magnitude of this change rate becomes equal to or smaller than the change rate threshold value. This correction is intended to prevent the travel state of the vehicle 1 from becoming unstable due to a sudden change in the steering angle when, for some reason, the short-term target steering angle has varied significantly beyond an appropriate range according to the vehicle speed, and the change rate threshold value is set so as to become smaller as the vehicle speed becomes higher.

The change rate correction unit 531 acquires information on the vehicle speed through, for example, the communication bus 100, and sets the change rate threshold value based on the acquired information on the vehicle speed. Alternatively, the ADAS control device 11 may set the change rate threshold value, and the change rate correction unit 531 may acquire information on that change rate threshold value through the communication bus 100.

When the magnitude of the short-term target steering angle calculated by the short-term target steering angle calculation unit 53 is larger than a maximum value of the steering angle that is set according to the travel mode of the vehicle 1, the target steering angle restriction unit 532 corrects the short-term target steering angle such that the magnitude of the short-term target steering angle becomes equal to or smaller than this maximum value. This correction is intended to prevent the travel state of the vehicle 1 from becoming unstable due to a sudden change in the steering angle when, for some reason, the short-term target steering angle has exceeded an appropriate range according to the travel mode of the vehicle 1.

Examples of the travel mode of the vehicle 1 include an autonomous parking mode in which the own vehicle is made to park into an intended parking space, and a follow-up travel mode in which the own vehicle travels on an expressway etc. so as to follow up a preceding vehicle. In the autonomous parking mode, the front wheels 101, 102 need to be turned to a large extent, and therefore the maximum value of the steering angle is set to be large. In the follow-up travel mode, the vehicle can travel at a relatively small steering angle enough for making a lane change, and therefore the maximum value of the steering angle is set to be small.

When the processing of the change rate correction unit 531 or the target steering angle restriction unit 532 has been executed, the short-term target steering angle calculation unit 53 outputs the short-term target steering angle after that processing to the motor control unit 54. When the change rate correction unit 531 or the target steering angle restriction unit 532 has been performing the correction of the short-term target steering angle in the control cycle immediately before the target steering angle acquisition unit 51 has newly acquired the target steering angle, the differential value calculation unit 52 uses the difference between the short-term target steering angle after that correction and the newly acquired target steering angle as the differential value. Thus, also when the change rate correction unit 531 or the target steering angle restriction unit 532 has corrected the short-term target steering angle, the short-term target steering angle can be gradually brought closer to the new target steering angle in each control cycle after the target steering angle acquisition unit 51 has newly acquired the target steering angle.

Third Embodiment

Next, a third embodiment of the present disclosure will be described with reference to FIG. 7 and FIG. 8. In the third embodiment, a case where a vehicle 1A is equipped with a steer-by-wire steering device 8 will be described.

Figure 7:
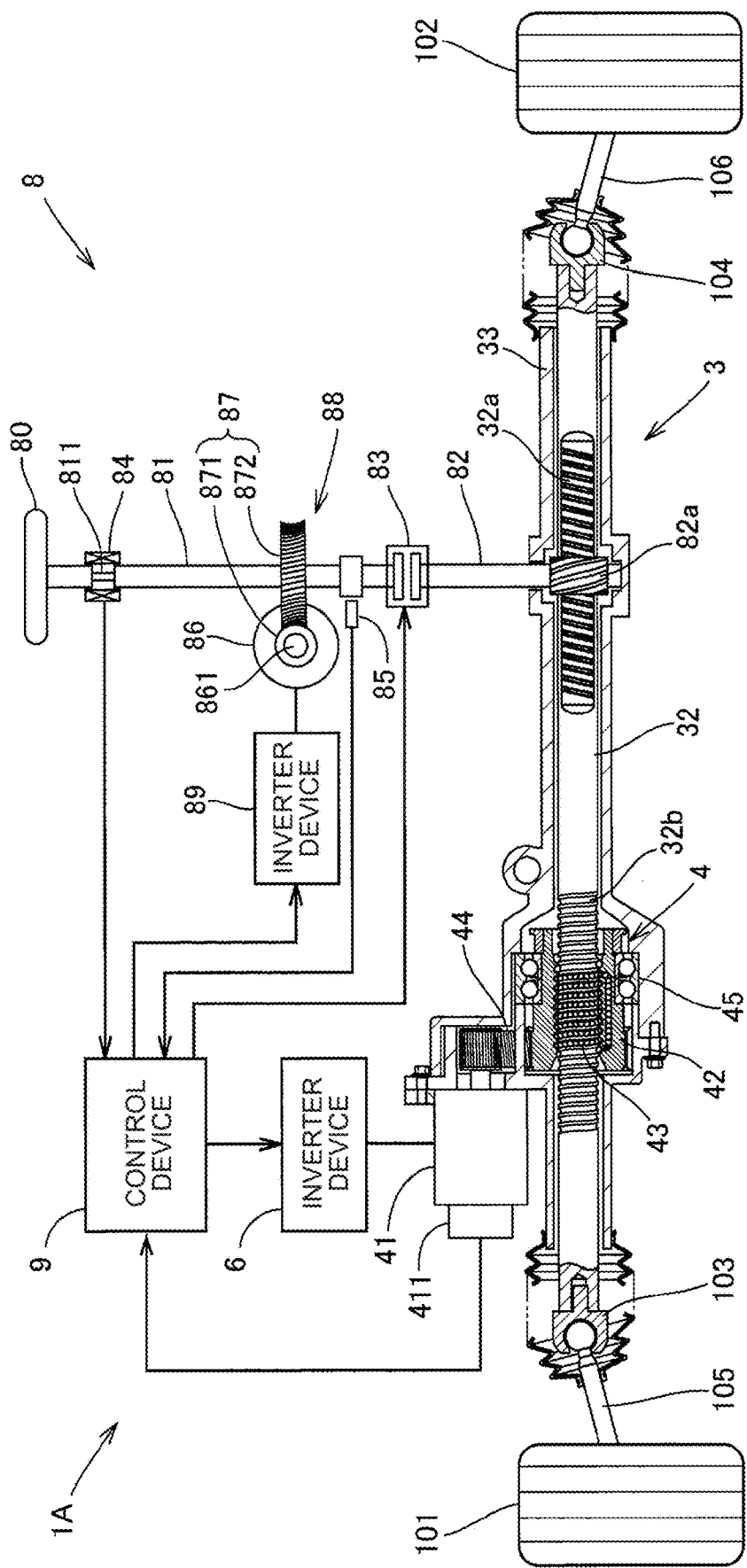
FIG. 7 is a configuration diagram showing an example of the schematic configuration of a vehicle according to a third embodiment.

FIG. 7 is a configuration diagram showing an example of the schematic configuration of the vehicle 1A according to the third embodiment. Members etc. in FIG. 7 that are the same as those described in the first embodiment will be denoted by the same reference signs as in FIG. 1 and overlapping description will be omitted.

The steering device 8 is a steer-by-wire type in which power transmission between a steering wheel 80 operated by the driver and the turning mechanism 3 is cut off, and includes the same turning mechanism 3, turning actuator 4, and inverter device 6 as in the first embodiment.

The steering device 8 further includes: a steering shaft 81 coupled to the steering wheel 80; a pinion shaft 82 having pinion teeth 82a that mesh with the rack teeth 32a of the rack shaft 32; an electromagnetic clutch 83 capable of coupling the steering shaft 81 and the pinion shaft 82 together so as to be unable to rotate relative to each other; a torque sensor 84 that detects a steering torque applied to the steering wheel 80; a steering angle sensor 85 that detects a steering angle that is a rotation angle of the steering shaft 81; a reaction force actuator 88 that applies a steering reaction force to the steering shaft 81 by a reaction force motor 86 and a speed reducer 87; an inverter device 89 that supplies a driving current to the reaction force motor 86; and a control device 9 that controls the turning actuator 4 and the reaction force actuator 88.

The speed reducer 87 is a worm gear mechanism having a worm 871 that is fixed on an output shaft 861 of the reaction force motor 86 and a worm wheel 872 that is mounted on the steering shaft 81. Part of the steering shaft 81 is formed by a torsion bar 811, and the torque sensor 84 detects the steering torque by an amount of twisting of the torsion bar 811.

Signals indicating the detection results of the torque sensor 84 and the steering angle sensor 85 are input into the control device 9. The control device 9 controls the reaction force motor 86 of the reaction force actuator 88 by outputting a PWM signal to the inverter device 89. The torque of the reaction force motor 86 is amplified by the speed reducer 87 and transmitted to the steering shaft 81. When an abnormality occurs in the reaction force actuator 88 or the turning actuator 4, the control device 9 couples the steering shaft 81 and the pinion shaft 82 together by the electromagnetic clutch 83 so as to be unable to rotate relative to each other.

Figure 8:
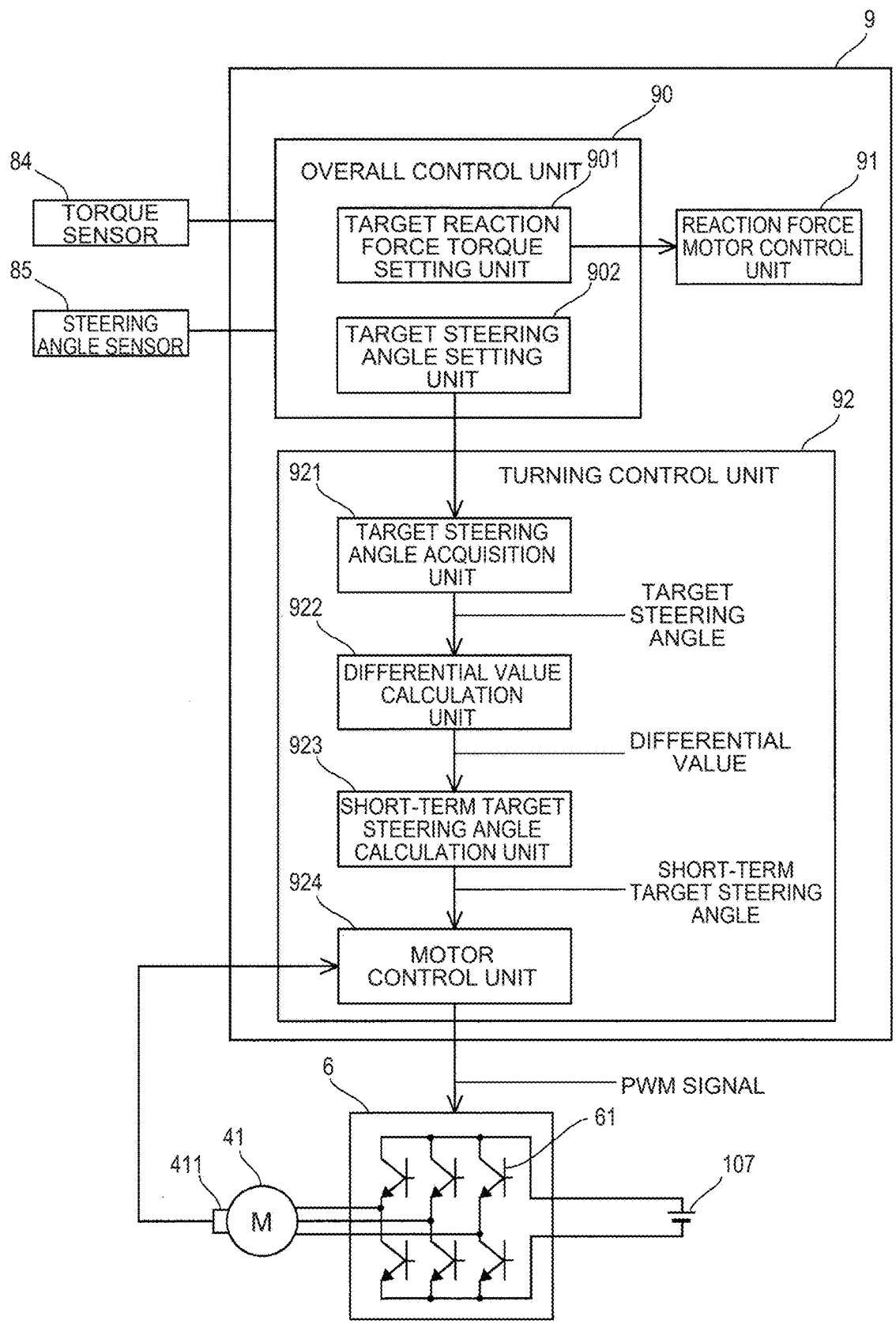
FIG. 8 is a block diagram showing the functional configuration of a control device according to the third embodiment.

FIG. 8 is a block diagram showing the functional configuration of the control device 9. The control device 9 has an overall control unit 90 into which the detection result of the steering torque by the torque sensor 84 and the detection result of the steering angle by the steering angle sensor 85 are input, a reaction force motor control unit 91 that controls the reaction force motor 86, and a turning control unit 92 that controls the turning actuator 4.

The overall control unit 90 has a target reaction force torque setting unit 901 and a target steering angle setting unit 902. The target reaction force torque setting unit 901 sets a target reaction force torque that is a target value of a reaction force torque generated by the reaction force motor 86 based on vehicle information. The target steering angle setting unit 902 sets a target steering angle that is a target value of the turning angle of the front wheels 101, 102 based on vehicle information. These pieces of vehicle information include the steering torque and the steering angle detected by the torque sensor 84 and the steering angle sensor 85, information on the vehicle speed, etc. The information on the vehicle speed can be acquired through, for example, CAN communication. As the vehicle speed becomes lower, the target steering angle setting unit 902 makes smaller a steering gear ratio that is a ratio of the turning angle of the front wheels 101, 102 to the steering angle detected by the steering angle sensor 85.

The reaction force motor control unit 91 controls the reaction force motor 86 by outputting a PWM signal to the inverter device 89 such that a torque according to the target reaction force torque set by the target reaction force torque setting unit 901 is generated in the reaction force motor 86.

The turning control unit 92 has a target steering angle acquisition unit 921, a differential value calculation unit 922, a short-term target steering angle calculation unit 923, and a motor control unit 924. The target steering angle acquisition unit 921, the differential value calculation unit 922, the short-term target steering angle calculation unit 923, and the motor control unit 924 function in the same manner as the target steering angle acquisition unit 51, the differential value calculation unit 52, the short-term target steering angle calculation unit 53, and the motor control unit 54 of the turning control device according to the first embodiment. Specifically, the target steering angle acquisition unit 921 acquires the target steering angle set by the target steering angle setting unit 902 on a predetermined acquisition cycle. When the target steering angle acquisition unit 921 has newly acquired the target steering angle, the differential value calculation unit 922 calculates a differential value that is a difference between the short-term target steering angle in the preceding control cycle and the newly acquired target steering angle. The short-term target steering angle calculation unit 923 distributes the differential value calculated by the differential value calculation unit 922, and thereby calculates the short-term target steering angle that is a target value of the steering angle for each control cycle shorter than the acquisition cycle on which the target steering angle acquisition unit 921 acquires the target steering angle. The motor control unit 924 controls the motor 41 such that the actual steering angle that is the actual turning angle of the front wheels 101, 102 becomes closer to the short-term target steering angle in each of the control cycles.

The short-term target steering angle calculation unit 923 calculates the short-term target steering angle based on a multiplied value obtained by multiplying the differential value by a coefficient according to the number of times of the control cycle since the target steering angle acquisition unit 921 has newly acquired the target steering angle, and on the short-term target steering angle in the control cycle immediately before the target steering angle acquisition unit 921 newly acquires the target steering angle. The short-term target steering angle calculation unit 923 sets the counter value to the initial value when the target steering angle is newly acquired, and adds to the counter value for each time of the control cycle since the target steering angle has been newly acquired. Then, the short-term target steering angle calculation unit 923 obtains a multiplied value using, as the coefficient, a value obtained by dividing the counter value by a multiplying factor of the acquisition cycle relative to the control cycle, and calculates the short-term target steering angle by adding this multiplied value to the short-term target steering angle in the control cycle immediately before the target steering angle acquisition unit 921 newly acquires the target steering angle. The turning control unit 92 may have functional components equivalent to the change rate correction unit 531 and the target steering angle restriction unit 532 described in the first embodiment.

According to this third embodiment, as in the first embodiment, the short-term target steering angle changes smoothly, so that the motor 41 can be smoothly rotated and the operation noise and the vibration occurring in the turning actuator 4 can be reduced.

Additional Description

While the present disclosure has been described above based on the first through third embodiments, these embodiments do not restrict the disclosure according to the claims. It should be noted that not all the combinations of the features described in the embodiment are essential to the solutions adopted by the disclosure.

It is possible to implement the present disclosure with changes made thereto as appropriate by omitting some components or adding or substituting components within such a range that no departure is made from the gist of the disclosure. For example, in the above-described first embodiment, the case has been described where the short-term target steering angle in the control cycle immediately before the target steering angle acquisition unit 51 newly acquires the target steering angle is used as the reference angle, and a value obtained by adding the reference angle to the multiplied value obtained by multiplying the differential value by the coefficient according to n is used as the short-term target steering angle. Alternatively, in the case where the target steering angle acquisition unit 51 can acquire the target steering angle on a regular basis (e.g., at 30 ms intervals), the differential value may be obtained by the difference between the preceding value and the current value of the target steering angle acquired by the target steering angle acquisition unit 51. Thus, "the target value of the steering angle before the acquisition" in the claims is not limited to the short-term target steering angle in the control cycle immediately before the target steering angle is newly acquired, and is intended to include also the preceding value of the target steering angle. The target steering angle acquisition unit is one example of "target steering angle acquisition circuit"; the differential value calculation unit is one example of "differential value calculation circuit"; the short-term target steering angle calculation unit is one example of "short-term target steering angle calculation circuit"; the motor control unit is one example of "motor control circuit"; the change rate correction unit is one example of "change rate correction circuit"; the target steering angle restriction unit is one example of "target steering angle restriction circuit"; and the target steering angle setting unit is one example of "target steering angle setting circuit."

What is claimed is:

1. A turning control device that controls an actuator configured to turn a steered wheel of a vehicle by a motor, the turning control device comprising:
    a target steering angle acquisition circuit configured to acquire a target steering angle on a predetermined acquisition cycle;
    a differential value calculation circuit configured to, when the target steering angle acquisition circuit has newly acquired the target steering angle, calculate a differential value that is a difference between a target value of a steering angle before the acquisition and the newly acquired target steering angle;
    a short-term target steering angle calculation circuit configured to calculate, by distributing the differential value, a short-term target steering angle that is a target value of the steering angle for each of control cycles shorter than the acquisition cycle; and
    a motor control circuit configured to control the motor such that an actual steering angle becomes closer to the short-term target steering angle in each of the control cycles, wherein
    the short-term target steering angle calculation circuit is configured to calculate the short-term target steering angle based on a multiplied value obtained by multiplying the differential value by a coefficient according to the number of control cycles since the target steering angle acquisition circuit has newly acquired the target steering angle, and on the target value of the steering angle before the acquisition.

2. The turning control device according to claim 1, wherein:
    the short-term target steering angle calculation circuit is configured to set a counter value to an initial value when the target steering angle is newly acquired, and to add to the counter value for each control cycle since the target steering angle has been newly acquired;
    the short-term target steering angle calculation circuit is configured to obtain the multiplied value using, as the coefficient, a value obtained by dividing the counter value by a multiplying factor of the acquisition cycle relative to the control cycle; and
    the short-term target steering angle calculation circuit is configured to calculate the short-term target steering angle by adding the multiplied value to the target value of the steering angle before the acquisition.

3. The turning control device according to claim 1, further comprising a change rate correction circuit configured to correct the short-term target steering angle, wherein:
    the change rate correction circuit is configured to, when a first short-term target steering angle changes relative to a second short-term target steering angle at a change rate higher than a change rate threshold value set according to a vehicle speed, correct the short-term target steering angle in an n-th (n is an integer not smaller than 1) control cycle such that a magnitude of the change rate becomes equal to or smaller than the change rate threshold value, the first short-term target steering angle being the short-term target steering angle in the n-th control cycle since the target steering angle acquisition circuit has newly acquired the target steering angle, the second short-term target steering angle being the short-term target steering angle in the control cycle immediately before the target steering angle is newly acquired; and the differential value calculation circuit is configured to, when the change rate correction circuit has been performing the correction in the control cycle immediately before the target steering angle acquisition circuit has newly acquired the target steering angle, use a difference between the short-term target steering angle after the correction and the newly acquired target steering angle as the differential value.

4. The turning control device according to claim 1, further comprising a target steering angle restriction circuit that, when a magnitude of the short-term target steering angle calculated by the short-term target steering angle calculation circuit is larger than a maximum value of the steering angle set according to a travel mode, corrects the short-term target steering angle such that the magnitude of the short-term target steering angle becomes equal to or smaller than the maximum value, wherein the differential value calculation circuit is configured to, when the target steering angle restriction circuit has been performing the correction in the control cycle immediately before the target steering angle acquisition circuit has newly acquired the target steering angle, use a difference between the short-term target steering angle after the correction and the newly acquired target steering angle as the differential value.

5. The turning control device according to claim 1, wherein the target steering angle acquisition circuit is configured to acquire the target steering angle by CAN communication, and the control cycle is 1 ms or shorter.

6. A steer-by-wire steering device comprising:
a steering wheel configured to be operated by a driver;
a steering shaft coupled to the steering wheel;
a reaction force actuator configured to apply a steering reaction force to the steering shaft;
a turning actuator configured to turn a steered wheel of a vehicle by a motor; and
a control device configured to control the reaction force actuator and the turning actuator, wherein:
the control device includes:
a target steering angle setting circuit configured to set a target steering angle that is a target value of a steering angle of the steered wheel based on vehicle information;
a target steering angle acquisition circuit configured to acquire the target steering angle from the target steering angle setting circuit on a predetermined acquisition cycle;
a differential value calculation circuit configured to, when the target steering angle acquisition circuit has newly acquired the target steering angle, calculate a differential value that is a difference between the target value of the steering angle before the acquisition and the newly acquired target steering angle;
a short-term target steering angle calculation circuit configured to calculate, by distributing the differential value, a short-term target steering angle that is a target value of the steering angle for each of control cycles shorter than the acquisition cycle; and
a motor control circuit configured to control the motor such that an actual steering angle becomes closer to the short-term target steering angle in each of the control cycles; and the short-term target steering angle calculation circuit is configured to calculate the short-term target steering angle based on a multiplied value obtained by multiplying the differential value by a coefficient according to the number of control cycles since the target steering angle acquisition circuit has newly acquired the target steering angle, and on the target value of the steering angle before the acquisition.

7. A vehicle comprising:
a turning actuator configured to turn a steered wheel of the vehicle by a motor;
a target steering angle setting circuit configured to set a target steering angle that is a target value of a steering angle based on vehicle information;
a target steering angle acquisition circuit configured to acquire the target steering angle from the target steering angle setting circuit on a predetermined acquisition cycle;
a differential value calculation circuit configured to, when the target steering angle acquisition circuit has newly acquired the target steering angle, calculate a differential value that is a difference between the target value of the steering angle before the acquisition and the newly acquired target steering angle;
a short-term target steering angle calculation circuit configured to calculate, by distributing the differential value, a short-term target steering angle that is a target value of the steering angle for each of control cycles shorter than the acquisition cycle; and
a motor control circuit configured to control the motor such that an actual steering angle becomes closer to the short-term target steering angle in each of the control cycles, wherein
the short-term target steering angle calculation circuit is configured to calculate the short-term target steering angle based on a multiplied value obtained by multiplying the differential value by a coefficient according to the number of control cycles since the target steering angle acquisition circuit has newly acquired the target steering angle, and on the target value of the steering angle before the acquisition.

* * * * *